United States Patent
Yang et al.

(10) Patent No.: US 8,456,988 B2
(45) Date of Patent: Jun. 4, 2013

(54) METHOD FOR ADMISSION CONTROL, AND APPARATUS AND COMMUNICATION SYSTEM THEREOF

(75) Inventors: Daoyan Yang, Shenzhen (CN); Yong Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 346 days.

(21) Appl. No.: 12/776,297

(22) Filed: May 7, 2010

(65) Prior Publication Data

US 2010/0214917 A1    Aug. 26, 2010

Related U.S. Application Data

(63) Continuation of application No. PCT/CN2008/072972, filed on Nov. 6, 2008.

(30) Foreign Application Priority Data

Nov. 9, 2007    (CN) .......................... 2007 1 0124501

(51) Int. Cl.
    *H04L 12/26*    (2006.01)
(52) U.S. Cl.
    USPC .......................................... 370/230; 370/235
(58) Field of Classification Search
    USPC .................... 370/230, 231, 235, 237, 238
    See application file for complete search history.

(56) References Cited

U.S. PATENT DOCUMENTS

| | | | |
|---|---|---|---|
| 5,335,222 A * | 8/1994 | Kamoi et al. ................. | 370/230 |
| 7,394,762 B2 * | 7/2008 | Leith et al. ..................... | 370/229 |
| 8,144,588 B1 * | 3/2012 | Ma .................................. | 370/235 |
| 2003/0152084 A1 * | 8/2003 | Lee et al. ................. | 370/395.21 |
| 2004/0081092 A1 | 4/2004 | Rhee et al. | |
| 2005/0030952 A1 * | 2/2005 | Elmasry et al. ............ | 370/395.2 |
| 2005/0052994 A1 * | 3/2005 | Lee ................................ | 370/230 |
| 2006/0104298 A1 | 5/2006 | McAlpine et al. | |

FOREIGN PATENT DOCUMENTS

| | | |
|---|---|---|
| CN | 101009697 A | 1/2007 |
| CN | 1941715 A | 4/2007 |
| WO | WO 2006/082280 A1 | 8/2006 |

OTHER PUBLICATIONS

Rejection Decision in corresponding Chinese Application No. 200710124501.0 (Jun. 22, 2011).

(Continued)

*Primary Examiner* — Hassan Kizou
*Assistant Examiner* — Toan Nguyen
(74) *Attorney, Agent, or Firm* — Leydig, Voit & Mayer, Ltd.

(57) ABSTRACT

The present invention relates to network communication field. A method for admission control, an apparatus and a communication system thereof are disclosed according to the present invention. The method includes measuring, by an egress node, traffic from an ingress node, and calculating a current congestion degree; comparing, by the egress node, the current calculated CLE with a last calculated CLE, and sending the current calculated CLE to an admission control decision entity by the egress node if the current calculated CLE crosses a predetermined threshold; receiving and storing the CLE by the admission control decision entity; and making a decision by the admission control decision entity based on the stored CLE, when a service traffic request arrives at the admission control decision entity, and determining whether to admit the service traffic request. According to the method for admission control provided by the present invention in which CLE is transferred proactively, the number of messages for transferring CLE is reduced when calling rate is high, and admission decision procedure is accelerated.

7 Claims, 7 Drawing Sheets

OTHER PUBLICATIONS

State Intellectual Property Office of the People's Republic of China, Examination Report in International Patent Application No. PCT/CN2008/072972 (Feb. 5, 2009).

Written Opinion in counterpart PCT Application No. PCT/CN2008/072972, mailed Feb. 5, 2009.

First Office Action in counterpart Chinese Application No. 200710124501.0, mailed Jul. 14, 2010.

Eardley, Philip, "Precongestion Notification Architecture—draft-ietf-pcn-architecture-01," Congestion and Pre-Congestion Notification Working Group, Internet Draft, Oct. 26, 2007.

Briscoe, B., et al. "A Framework for Admission Control over DiffServ using Pre-Congestion Notification," TSVWG, Internet Draft, draft-briscoe-tsvwg-cl-architecture-01.txt, Oct. 24, 2005.

Notification of Reexamination in corresponding Chinese Patent Application No. 200710124501.0 (Jan. 15, 2013).

Extended European Search Report in corresponding European Application No. 08855436.5-1249, mailed Sep. 27, 2010.

"NGN Functional Architecture; Resource and Admission Control Subsystem (RACS); Release 1," *ETSI*, (Draft) ETSI ES 2XX XXX V<1.2.0> Dec. 1, 2004.

Briscoe, B., et al. "A Framework for Admission Control over DiffSery using Pre-Congestion Notification," TSVWG, Internet Draft, draft-briscoe-tsvwg-cl-architecture-01.txt, Oct. 24, 2005.

* cited by examiner

FIG.1

PRIOR ART

FIG.2

PRIOR ART

METHOD FOR ADMISSION CONTROL, AND APPARATUS AND COMMUNICATION SYSTEM THEREOF

CROSS-REFERENCE TO RELATED APPLICATIONS

This application is a continuation of International Application No. PCT/CN2008/072972, filed on Nov. 6, 2008, which claims priority to Chinese Patent Application No. 200710124501.0, filed on Nov. 9, 2007, both of which are hereby incorporated by reference in their entireties.

FIELD OF THE INVENTION

The present invention relates to network communication field, and more specifically, to a method for admission control, and an apparatus and a communication system thereof.

BACKGROUND

Figure 1:
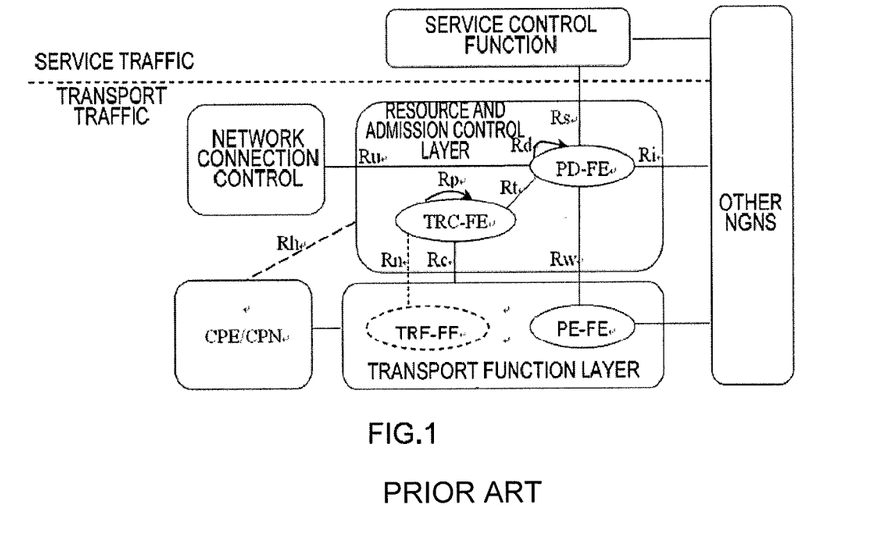
FIG. 1 illustrates an architecture of ITU-T Resource and Admission Control Function (RACF)

In Next Generation Network (NGN) architecture, resource and admission control layer is introduced between service control layer and bearer transport layer, shielding transmission network details from the service layer and supporting the separation between service control function and transport function. The resource and admission control layer perceives the resource usage status of the transport network, and ensures that transport network resources are utilized correctly and rationally via admission control and resource control, so that Quality of Service (QoS) can be ensured, and moreover, bandwidth and service pirating can be avoided. As shown in FIG. 1, Resource and Admission Control Function (RACF) architecture standard is illustrated. In the architecture, the resource and admission control procedure includes the following. RACF may statically configure, or each bearer transport node may statically report topology and resource status (mainly available link bandwidth of each segment). When a service is established, the service layer requests transport resource (e.g., bandwidth) from the RACF. If the RACF finds that the resource is sufficient, then the RACF may admit the service request, and deduct a corresponding resource. If the RACF finds that the resource is insufficient, the admission is not allowed.

Figure 2:
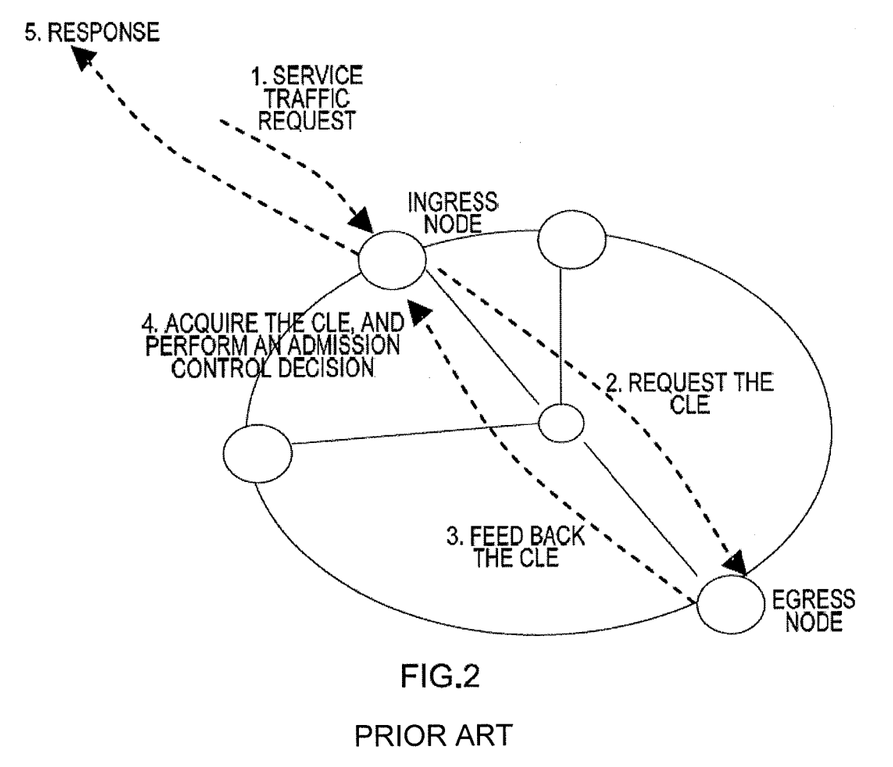
FIG. 2 illustrates a schematic diagram of a method for admission control where a CLE is transferred between an ingress node and an egress node in an on-demand manner in a Pre-Congestion Notification (PCN) network according to conventional arts.

FIG. 2 illustrates a schematic diagram where admission control is accomplished by directly transmitting congestion information between an ingress node and an egress node in an on-demand manner in a Pre-Congestion Notification (PCN) network according to conventional arts. A PCN network usually includes ingress nodes, interior nodes and egress nodes, where the ingress nodes and the egress nodes are all edge nodes, and are distinguished by service flowing direction, that is, the direction of traffic. For a same edge node pair, A and B, assume that the direction of traffic is A→B, then A is the ingress node while B is the egress node; assume that the direction of traffic is B→A, then A is the egress node while B is the ingress node.

In a PCN network, the ingress node is generally responsible for conducting the admission control decision entity on data traffic entering the PCN domain, where the admission control decision may depend on a congestion status from the ingress node to the corresponding egress node. In a PCN network, the interior node is responsible for monitoring link traffic. When an interior node finds an upcoming congestion (traffic crosses a pre-congestion threshold) on a link connected therewith, then a receiving message is marked (with a pre-congestion mark). The egress node measures traffic that belongs to the same ingress node, where a weighed ration of traffic with pre-congestion mark to all of traffic from the ingress node is usually measured as a congestion degree, that is, Congestion Level Estimate (CLE). Next, the CLE is carried in a signaling message and transferred to the ingress node. In this way, the CLE represents a congestion status from the ingress to the egress, and accordingly, the ingress node may implement admission control decision based on the CLE.

Referring to FIG. 2, an existing admission control method may specifically include the followings.

1. A service traffic request arrives at an ingress node;
2. The ingress node queries a CLE from an egress node;
3. The egress node sends the current CLE to the ingress node;
4. The ingress node may determine whether to admit the service traffic request based on the acquired CLE. If the predetermined threshold is exceeded, the ingress node denies the service traffic request; if the predetermined threshold is not exceeded, the ingress node admits the service traffic request, and accordingly, switches on traffic control;
5. The ingress node notifies the service requestor of the result of the admission decision.

In implementing the present invention, it is discovered that the above conventional solution enmeasureers at least the following problems. The conventional admission control method is characterized in that, the egress node needs to transfer the CLE for each coming service traffic, thereby wasting signaling messages when the calling rate is very high.

SUMMARY

A method for admission control, and an apparatus and a communication system thereof are provided according to embodiments of the present invention so as to realize the admission control based on proactive transfer of a congestion degree, that is, Congestion Level Estimate (CLE).

A method for admission control is provided according to an embodiment of the present invention. The method includes:

measuring, by an egress node, traffic from an ingress node, and calculating a current congestion degree;

comparing, by the egress node, the current calculated congestion degree with a last calculated congestion degree, and sending the current calculated congestion degree to an admission control decision entity by the egress node if a predetermined threshold is between the current calculated congestion degree and the last calculated congestion degree;

receiving and storing the congestion degree by the admission control decision entity; and making a decision by the admission control decision entity based on the stored congestion degree, and determining whether to admit a service traffic request, when the service traffic request arrives at the admission control decision entity.

A communication system is also provided according to an embodiment of the present invention. The communication system includes:

a first edge node, configured to measure traffic from a second edge node, calculate a current congestion degree; and compare the current calculated congestion degree with a last calculated congestion degree, then send the current calculated congestion degree to an admission control decision entity if a predetermined threshold is between the current calculated congestion degree and the last calculated congestion degree; and the admission control decision entity, configured to receive and store the congestion degree; make a decision about whether to admit a service traffic request based on the stored congestion degree when the service traffic request arrives at the admission control decision entity.

A network edge apparatus is also provided according to an embodiment of the present invention. The network edge apparatus includes:

a communication processing module, configured to send a congestion degree to an admission control decision entity;

a congestion processing module, configured to measure traffic from other network edge apparatuses, and calculate a current congestion degree; and a control module, configured to compare the current calculated congestion degree with a last calculated congestion degree, and instruct the communication processing module to send the congestion degree when a predetermined threshold is between the current calculated congestion degree and the last calculated congestion degree.

An admission control system is also provided according to an embodiment of the present invention. The admission control system includes:

a congestion processing module, configured to receive, store and update a congestion degree sent from one or more edge nodes, where the received congestion degree crosses a predetermined threshold when compared with a last received congestion degree; and an admission control decision module, configured to make a decision about whether to admit a service traffic request based on the updated congestion degree, when the service traffic request arrives at the admission control decision entity.

Compared with conventional arts, according to the method for admission control proposed by the present invention in which CLE is transferred proactively, the number of messages for transferring CLEs is reduced when calling rate is high, and admission decision making is accelerated. According to the network edge apparatus, the current calculated CLE may be sent to the admission control decision entity when the CLE crosses a threshold, instead of sending the CLE when a service traffic request arrives each time, so that the number of messages for transferring CLEs is reduced when calling rate is high. According to the admission control system, the number of messages for transferring CLEs is thereby reduced when calling rate is high. Moreover, because the admission control system may be independent of the ingress node, admission control based on congestion may have a more flexible application.

DETAILED DESCRIPTION

The present invention relates to an admission control decision entity in the network. More specifically, the present invention relates to a method, a system and an apparatus for realizing service admission control based on a congestion notification mechanism.

The detailed description of embodiments of the present invention, including exemplary modes designed by the inventor for implementing the present invention is made below. Examples of these embodiments are illustrated in annexed drawings, where function modules with a same reference sign therein have a same or similar function. Although the present invention is presented in conjunction with the embodiments, the embodiments presented shall not be construed as a limitation to the present invention.

According to an embodiment of the present invention, a method for admission control based on proactive transfer of congestion information is provided. According to the method, before the arrival of a traffic flow request, an admission control decision entity pre-acquires a congestion degree and stores the congestion degree. When the service traffic request arrives at the admission control decision entity, the admission control decision entity may make a decision about whether to admit this service traffic request based on the stored congestion degree. CLE herein represents a congestion degree, configured to estimate a congestion degree. On-demand manner herein refers to the admission control method shown in FIG. 2 in which CLE is transferred upon each arrival of a service traffic, whereas Proactive manner refers to the admission control method in which the transfer of CLE is not driven by service traffic. According to the method for admission control provided by the present invention in which CLE is transferred proactively, the number of messages for transferring CLE is reduced when calling rate is high, and admission decision making is accelerated.

Specifically, a method for admission control based on proactive transfer of CLE according to an embodiment of the present invention is provided. The method includes, measuring, by an egress node, traffic from an ingress, and calculating a current CLE; comparing, by the egress node, the current calculated CLE with a last calculated CLE, and sending the current CLE to an admission control decision entity (probably configured at the ingress node, or probably configured at a center control node) by the egress node, if the CLE crosses a predetermined threshold (e.g., a predetermined threshold is between the current calculated CLE and the last calculated CLE); receiving and storing and/or updating the CLE by the admission control decision entity. When a service traffic request arrives at the admission control decision entity, the admission control decision entity may make a decision about whether to admit this service traffic request based on the stored CLE. In terms of sending the CLE to the admission control decision entity by the egress node, an over-threshold method may be utilized for detecting a change in the CLE. When comparing the current calculated CLE with the last calculated CLE, if the current calculated CLE crosses a predetermined range, the egress node may send the current calculated CLE to the admission control decision entity. One or more congestion degree thresholds may be predetermined at the egress node. When the current CLE calculated by the egress node is compared with the last calculated CLE, and the current CLE crosses the congestion degree threshold, the egress node may send the current calculated CLE to the admission control decision entity.

Timing triggering may assist in addition to the over-threshold triggering. That is, the egress node may periodically send the present or current calculated CLE to the admission control decision entity based on a certain time interval. Optionally, the admission control decision entity may periodically query the CLE from the egress node based on a certain time interval. Moreover, the admission control decision entity may age and invalid the CLE periodically. When the admission control decision entity is implemented at the ingress node, the egress node may forward the CLE to the ingress node via a relay agent, thereby accelerating the efficiency of sending the CLE from the egress node to the ingress node. Furthermore, the egress node packages CLEs being sent to a plurality of ingress nodes into one message, and then sends the message to the relay agent node. Next, the relay agent node reassembles CLEs from a plurality of egress nodes, packages CLEs that belong to the same ingress node into one message, and forwards the message to this ingress node. This ingress node includes the admission control decision entity capable of making an admission decision based on a CLE.

After receiving the CLE, the admission control decision entity may set a validity period for the CLE. The CLE will be aged and set to an invalid status when the validity period expires. The admission control decision entity or the ingress node may query the CLE from the egress node before the CLE is invalided.

A communication system is provided according to one embodiment of the present invention. The communication system includes:

a first edge node (e.g., egress node), configured to measure traffic from a second edge node (ingress node), and calculate a current congestion degree, that is, Congestion Level Estimate (CLE); and is further configured to compare the current calculated CLE with the last calculated CLE, where if the current calculated CLE crosses a predetermined range, the egress node sends the current calculated CLE to an admission control decision entity; and the admission control decision entity, configured to receive and store and/or update the CLE; and is further configured to make a decision about whether to admit this service traffic request based on the stored CLE, when a service traffic request arrives at the admission control decision entity.

If one or more CLE thresholds are predetermined at the first edge node, the current calculated CLE exceeding a predetermined threshold means that the current calculated CLE exceeding at least one of the predetermined CLE thresholds.

A timing task is configured for the admission control decision entity, which may periodically query a CLE from the first edge node based on a time interval. Moreover, an aging task is also configured for the admission control decision entity, which may age and invalid a CLE periodically. The admission control decision entity may query a CLE from the first edge node before the CLE is invalided.

The admission control decision entity is configured at the second edge node (ingress node). Of course, the admission control decision entity may not always be implemented at the ingress node. The admission control decision entity may possibly be implemented at a separate control node. For example, according to RACF architecture, an intermediate control node may be included in the RACF layer for implementing the admission control decision function.

A timing task is configured for the first edge node, which may send a CLE to the admission control decision entity each time when the timing task ends.

The communication system may include a relay agent node, configured to receive the CLE of the first edge node, and relay the CLE to the admission control decision entity. The relay agent node therein is configured to reassemble CLEs from a plurality of first edge nodes, package CLEs belonging to the same ingress into one message, and send to the admission control decision entity configured at the second edge node.

A network edge apparatus is also provided according to an embodiment of the present invention. The network edge apparatus includes:

a communication processing module, configured to send a CLE to an admission control decision entity; a congestion processing module, configured to measure traffic from other network edge apparatuses, and calculate a current CLE; a control module, configured to compare the current calculated CLE with a last calculated CLE, and instruct the communication processing module to send the CLE when the current calculated CLE crosses a predetermined threshold.

The control module includes a threshold setting unit, where one or more CLE thresholds are predetermined; a threshold comparing unit, configured to compare the current calculated CLE with the last calculated CLE, and determine whether the current calculated CLE crosses a predetermined CLE threshold; a control unit, configured to instruct the communication processing module to send the current calculated CLE out when the current calculated CLE crosses a predetermined CLE threshold. The control module may also include a timing unit, configured to conduct a timing task; and the control unit may instruct the communication processing module to send the current calculated CLE each time when the timing task ends; a query responding unit, configured to respond to a query request from the admission control decision entity; then, the control unit may further instruct the communication processing module to send the current calculated CLE out based on the response from the query responding unit.

An admission control system is further provided according to an embodiment of the present invention. The admission control system includes: a congestion processing module, configured to receive, store and update a CLE from one or more edge nodes, where the updated CLE crosses a predetermined threshold when compared with a CLE last received; an admission control decision module, configured to make a decision about whether to admit this service traffic request based on the updated CLE, when a service traffic request arrives at the admission control decision entity. The admission control system may further include a control module, configured to conduct a timing task, and to instruct the query module to send a request for querying a CLE to one or more edge nodes each time when the timing task ends.

Figure 3:
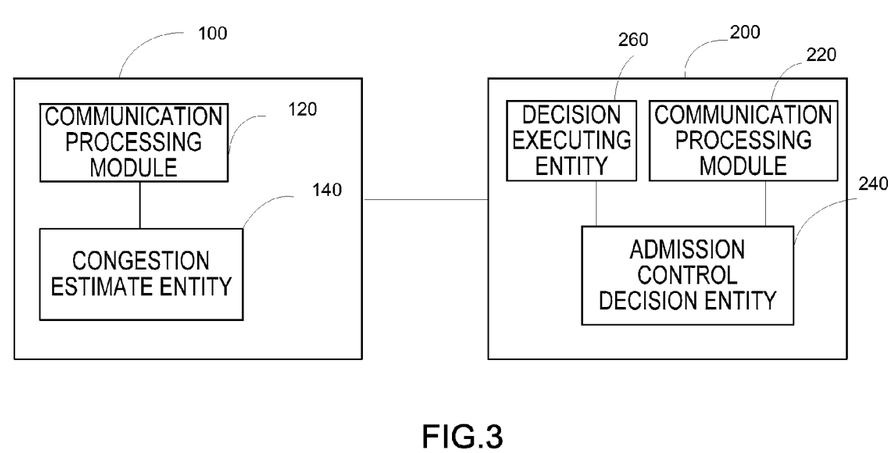
FIG. 3 illustrates a system block diagram according to Embodiment 1 of the present invention.

FIG. 3 illustrates a system block diagram according to Embodiment 1 of the present invention.

The system shown in FIG. 3 includes a first network apparatus 100 and a second network apparatus 200, where a communication connection is established between the first network apparatus 100 and the second network apparatus 200, capable of performing unidirectional or bidirectional service transport. The service traffic from the first network apparatus 100 to the second network apparatus 200 refers to one service flow direction, whereas the service traffic from the second network apparatus 200 to the first network apparatus 100 refers to another service flow direction. The first network apparatus 100 includes a communication processing module 120 and a congestion estimate entity 140. The second network apparatus 200 includes a communication processing module 220, an admission control decision entity 240 and a decision executing entity 260. The communication processing module 120 and the communication processing module 220 may have a similar or a same function for communication with other network apparatuses. Consequently, a communication connection may be established between the first network apparatus 100 and the second network apparatus 200 via their respective communication processing modules. The basic function of the congestion estimate entity 140 is used to measure traffic in the service flow direction from one or more second network apparatuses 200 to the first network apparatus 100, acquire congestion estimate information, where the congestion estimate information includes a CLE. The admission control decision entity 240 is configured to decide based on the CLE in the congestion estimate information, and acquires a decision result, where the decision result includes information of whether to admit the service traffic request, or may also include other parameters information. Accordingly, the admission control decision entity 240 may instruct the decision executing entity 260 to perform operations according to the decision result.

Embodiment 1

Figure 4:
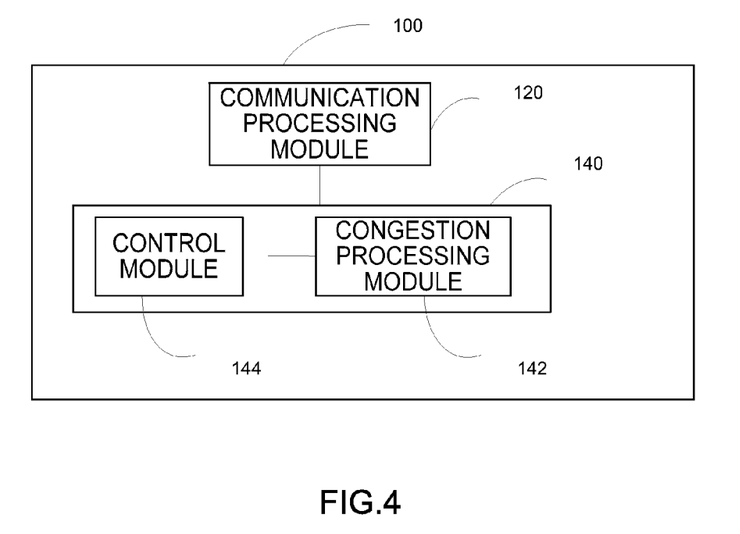
FIG. 4 illustrates a block diagram of the congestion estimate entity in Embodiment 1 of the present invention.

Referring to FIG. 3 in conjunction with FIG. 4, Embodiment 1 of the present invention is illustrated. FIG. 4 illustrates a block diagram of the first network apparatus according to Embodiment 1 of the present invention, where the block diagram of the congestion estimate entity 140 in the present embodiment is further illustrated. According to the present embodiment, the congestion estimate entity 140 includes a congestion processing module 142 and a control module 144. The congestion processing module 142 is configured to conduct a congestion estimate of traffic in the service flow direction from one or more second network apparatuses 200 to the first network apparatus 100, and acquire a calculated CLE; The control module 144 is configured to control the sending of the CLE to the second network apparatus 200 via the communication processing module 120. The admission control decision entity 240 of the second network apparatus 200 receives and stores the CLE from the first network apparatus 100. When a service traffic request arrives at the admission control decision entity 240, the admission control decision entity 240 makes a decision based on the stored CLE, acquires a decision result, and notifies the decision executing entity 260 to perform operations according to the decision result. The decision executing entity 260 may send a response message to the service requestor so as to inform the service requestor.

The control module 144 may send the CLE based on a predetermined condition. The predetermined condition may be configured manually, or configured remotely. When the predetermined condition is configured remotely, the configuration may be conducted via a remote apparatus such as a network administrator or a policy apparatus or other service apparatus. The description of processing procedure of the control module 144 will be detailed later.

Figure 5:
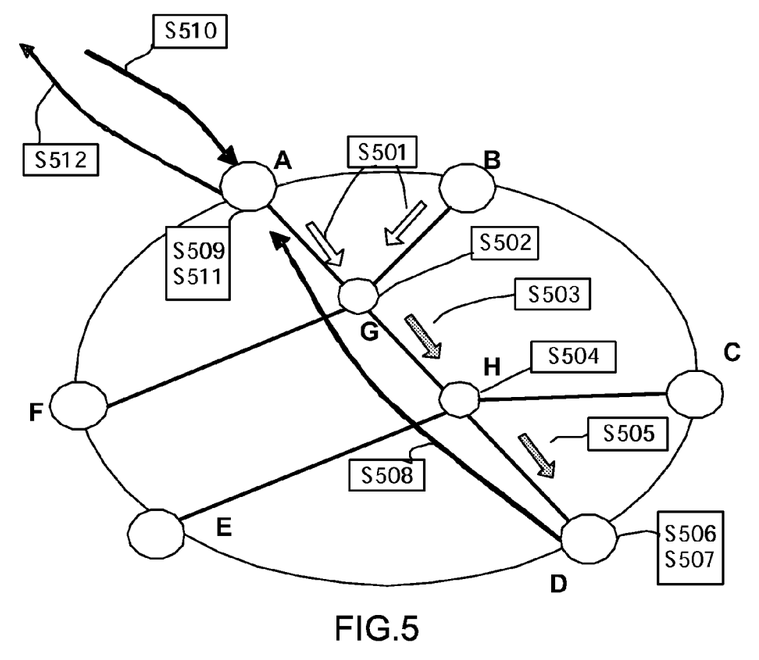
FIG. 5 illustrates a flowchart of information interaction in an application scenario of PCN domain for Embodiment 1 of the present invention.

FIG. 5 illustrates a flowchart of information interaction in an application scenario of PCN domain for Embodiment 1 of the present invention. In this PCN domain, nodes A, B, C, D, E and F are edge nodes of a transport network, whereas nodes G and H are intermediate nodes. A-D and B-D construct a node pair for service flow direction A→D and a node pair for service flow direction B→D, respectively. The admission control decision function is implemented at an ingress node. In this PCN domain, the information interaction procedure includes the followings.

S501: Node A and node B send service traffic to intermediate node G.

S502-S503: Node G receives the service traffic from node A and node B, and determines whether service congestion occurs. If service congestion occurs, the received service traffic will be marked with a congestion mark. Next, node G transfers the service traffic to node H. Specific processing for determining the service congestion and related algorithm may refer to conventional arts, which are omitted herein for brevity.

S504-S505: The processing procedure of node H is to similar to that of node G, which is omitted herein for brevity.

S506-S508: Node D receives service traffic from node H, identifies and measures the congestion mark in the service traffic. Then, node D may estimate based on the received congestion mark and acquire a CLE of service flow direction A→D and a CLE of service flow direction B→D respectively. In addition, node D determines whether to send the acquired CLEs to corresponding node A and node B, respectively. If the condition is met, node D may send the CLE to the corresponding node.

Referring to FIG. 5, node D determines to send the CLE of service flow direction A→D to node A, then the CLE of service flow direction B→D will be sent to node B.

S509: Node A receives and stores the CLE from node D.

S510-S512: When a service traffic request is received, node A may make an admission control decision based on pre-stored CLE, determine whether to admit this service request, and acquire a decision result. The decision result may include accept/deny, or may also include other parameters. Then, node A executes the decision result, and sends a response message to the service requestor.

It is to be noted that S501-S509 and S510-S512 are relatively independent. Node D may proactively send the CLE to node A no matter whether or not there is any service traffic request at this point. In this way, there is no need to transfer a CLE for each service traffic. Thus, signaling messages are reduced when calling rate is high. Moreover, ingress node A may not need to maintain a CLE status for each service traffic. Rather, ingress node A may maintain a CLE status based on each ingress-egress pair.

In the present embodiment, CLE information may be transmitted among edge nodes over RSVP/RSVP-TE protocol, or using other point-to-point implementation approaches, e.g., Bidirectional Forwarding Detection (BFD) protocol. CLE is encapsulated in a certain type of BFD protocol message with a source address being the address of egress node D and a destination address being the address of ingress node A.

Figure 6:
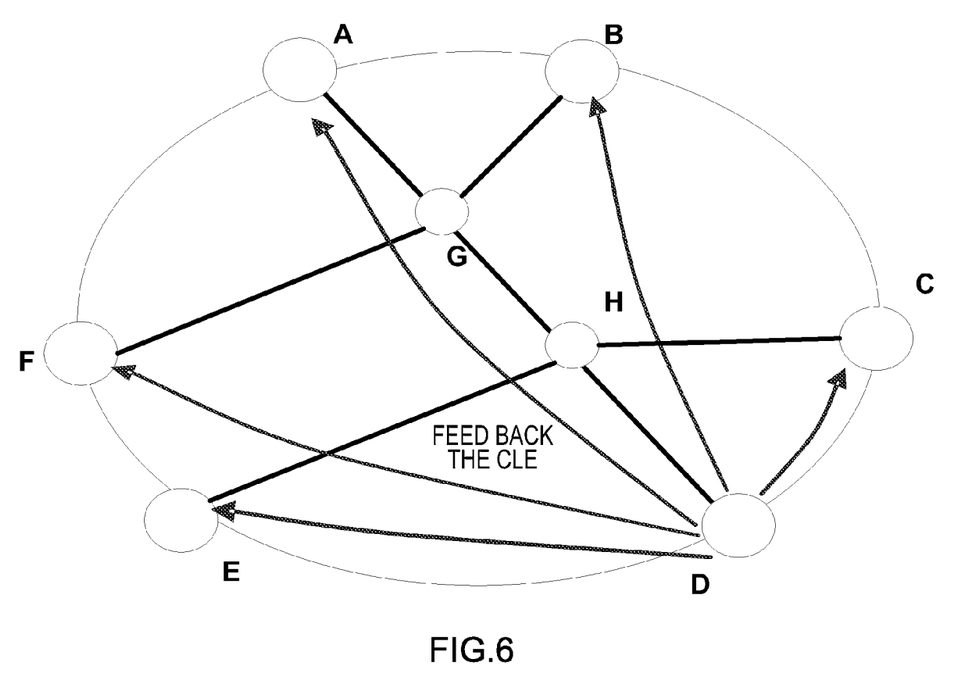
FIG. 6 illustrates a schematic diagram where CLE is sent proactively by an egress node to a plurality of ingress nodes in a point-to-point manner.

FIG. 6 illustrates a schematic diagram where CLE of each service flow direction is sent proactively by an egress node to a plurality of ingress nodes in a point-to-point manner, specific procedure of which is omitted herein for brevity.

Figure 7:
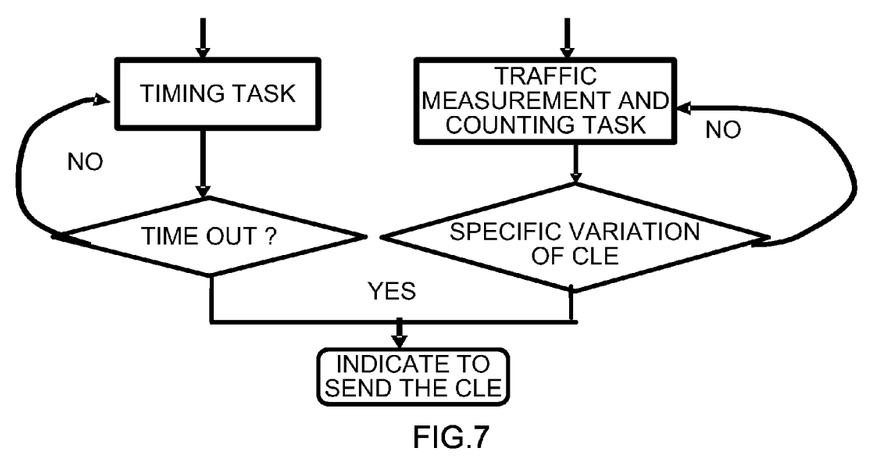
FIG. 7 illustrates a flowchart where the transfer of CLE is triggered by a control module according to an embodiment of the present invention.

The control procedure of the control module 144 will be introduced below.

FIG. 7 illustrates a flowchart where driving instruction is generated by a control module according to an embodiment of the present invention.

(1) A time period is preset. Thus, CLE can be sent periodically. According to the left branch shown in FIG. 7, the preset time period may be 5 s, 4 s, 3 s, etc. This preset time period may be adjusted according to factors affecting the congestion such as service calling rate.

(2) The variation of CLE crosses a predetermined range. This can be achieved by presetting a CLE threshold, where the threshold configuration may depend on the deployment, e.g., one or more thresholds may be configured. According to the right branch shown in FIG. 7, each measured CLE is compared to a previous measured value. If the current CLE crosses a threshold, then the current CLE will be sent to an admission control decision entity, which is not restricted to the timer. Basically, this is to notify a relative accurate CLE in the case that congestion situation may change dramatically within a sending interval or in the case that a key threshold is exceeded. For example, there may set three thresholds, i.e., 0.1, 0.2, and 0.3. When the CLE, from last calculated 0.08 to current calculated 0.12, crosses the threshold 0.1, then the CLE=0.12 will be sent out. Or, when the CLE decreases from last calculated 0.25 to current calculated 0.18, then the CLE=0.18 will be sent out immediately. Other threshold solutions may also be utilized, for example, supposing that the difference between the current calculated CLE and the last calculated CLE crosses a certain range, then the current CLE will be sent to an admission control decision entity. Overall, this triggering condition shall be capable of reflecting specific variation of CLE.

The function for triggering the transfer of CLE periodically may not be implemented at an egress node, e.g., the first network apparatus 100 of the present example. Rather, the function may be implemented at an admission control decision entity. In the present embodiment, the admission control decision entity may locate at an ingress node, e.g., the second network apparatus 200 of the present example. The admission control decision entity 240 that realizes the timing for the second network apparatus 200 may query the CLE from the first network apparatus 100 periodically.

One extreme case is that the interval for periodically transferring CLE is set as infinity, i.e., there is no timer for triggering, only an absolute threshold is set, e.g., 0.2. In this case, the egress node may send the CLE to the ingress node merely when the threshold 0.2 is exceeded, and instruct the ingress node to stop admitting services. Or, when the CLE decreases from a value over the threshold 0.2 to a value under the threshold 0.2, the egress node may send the CLE to the ingress node, and instruct the ingress node to continue admitting services.

Figure 8:
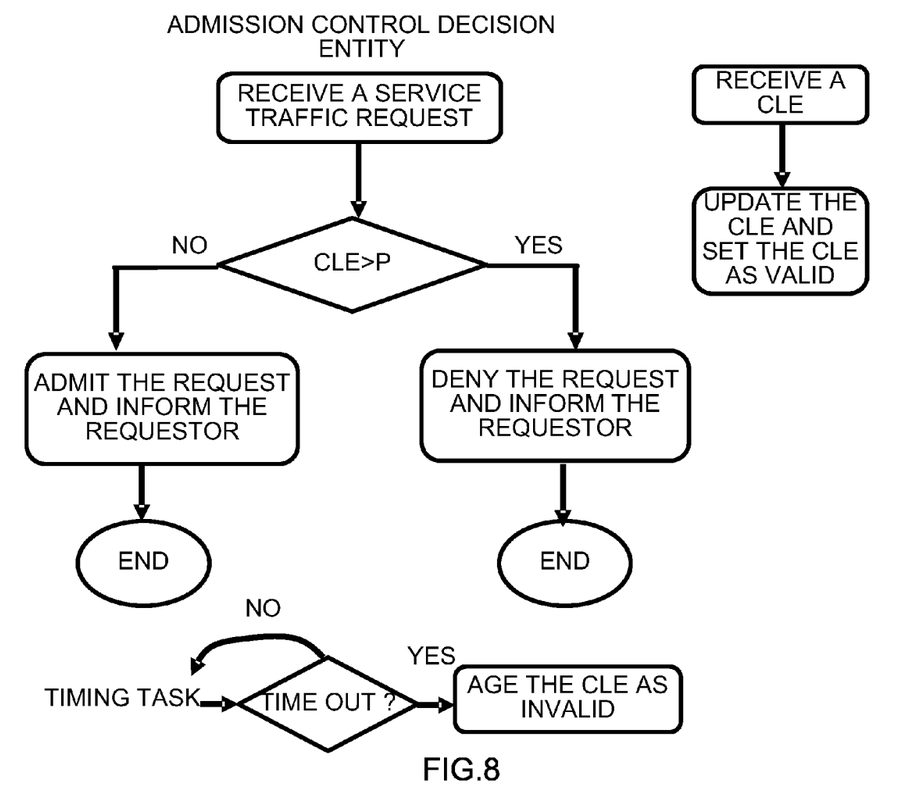
FIG. 8 illustrates a flowchart of the implementation of an admission control decision entity.

FIG. 8 illustrates a flowchart of the implementation of the admission control decision entity 240. In the present embodiment, the admission control decision entity is implemented at the ingress node, including two procedures as follows.

A procedure of the maintenance of CLE status

When the CLE transferred by the egress node is received, it is stored and set to valid. Also, a certain amount of aging time may be set, e.g., 5-20 s. The aging time is generally 2-5 times the interval for periodically transferring the CLE, e.g., the aging time may be set as three times the interval for periodically transferring the CLE. The aging timer is reset once the CLE is updated. Before the CLE is aged, the CLE may be queried from the egress node.

A procedure of admission control decision

When a service traffic request is received, it is determined whether the stored CLE is higher than a predetermined threshold P. If the stored CLE is higher than a predetermined threshold P, then the service traffic request will be denied, and the requestor will be notified. Otherwise, the service traffic request will be admitted, and the requestor will be notified of this successful admission. Accordingly, the ingress node will allow the service traffic to pass through.

Embodiment 2

Figure 9:
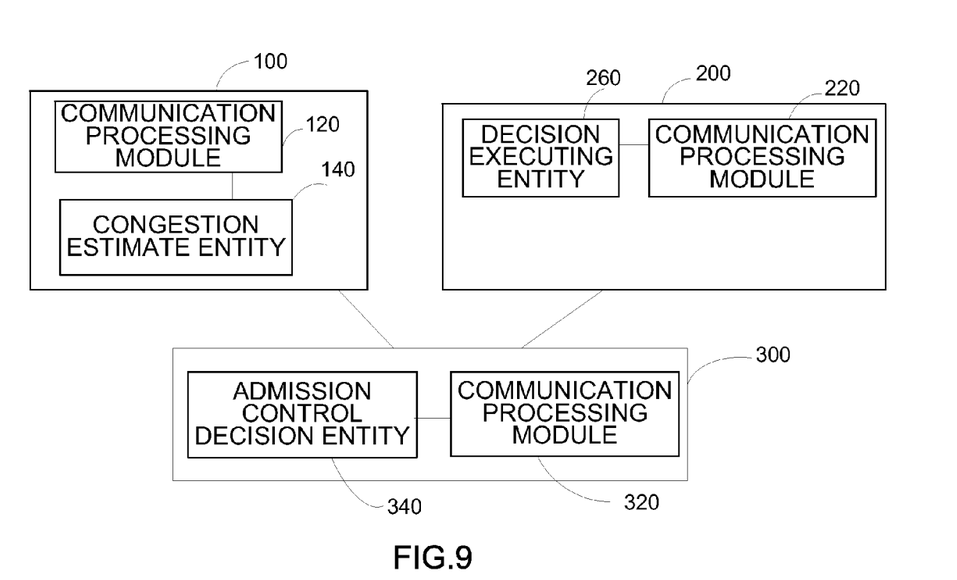
FIG. 9 illustrates a system block diagram according to Embodiment 2 of the present invention.

FIG. 9 illustrates a system block diagram according to Embodiment 2 of the present invention.

The system shown in FIG. 9 includes a first network apparatus 100 and a second network apparatus 200, where a communication link is established between the first network apparatus 100 and the second network apparatus 200, capable of unidirectional or bidirectional service transport. The service traffic from the first network apparatus 100 to the second network apparatus 200 refers to one service flow direction, whereas the service traffic from the second network apparatus 200 to the first network apparatus 100 refers to another service flow direction. The first network apparatus 100 includes a communication processing module 120 and a congestion estimate entity 140. The second network apparatus 200 includes a communication processing module 220 and a decision executing entity 260. The communication processing module 120 and the communication processing module 220 may have a similar or a same function for communication with other network apparatuses. Consequently, a communication connection may be established between the first network apparatus 100 and the second network apparatus 200 via their respective communication processing modules. The basic function of the congestion processing module 140 is to conduct a congestion estimate of traffic in the service flow direction from one or more second network apparatuses 200 to the first network apparatus 100, and acquire a calculated CLE.

The system shown in FIG. 9 further includes a third network apparatus 300. The third network apparatus 300 includes a communication processing module 320 and an admission control decision entity 340. The communication processing module 320 is configured for communication with other network apparatuses, and may have a function similar to or same with the communication processing modules 120 and 220. Furthermore, the communication processing module 320 may have a greater capability in protocol communication processing than that of the communication processing modules 120 and 220. The admission control decision entity 340 receives and stores the CLE from one or more the first network apparatuses 100 and/or the second network apparatus 200 via the communication processing module 320. When a service traffic request arrives at the admission control decision entity 340, the admission control decision entity 340 makes a decision based on the stored CLE, and notifies the decision executing entity 260 of a decision result via the communication processing module 300 for executing the decision result. The decision request includes information of whether to admit the service traffic request, or may also include other parameters information.

According to Embodiment 2, the trigger mechanism for acquiring a CLE by the admission control decision entity 340 includes the following approaches.

According to the first approach, the third network apparatus 300 determines whether to proactively request a CLE from the first network apparatus 100 and/or the second network apparatus 200. The first approach is similar to the periodically query triggering mechanism of the second network apparatus 200 in Embodiment 1, i.e., a control module may be included in the third network apparatus 300, configured to perform a control processing, proactively acquire and store a CLE of a corresponding service flow direction from the first network apparatus 100 and/or the second network apparatus 200, which is omitted herein for brevity. The first network apparatus 100 and the second network apparatus 200 are peer apparatuses, and may have exactly the same function, each being an ingress node or an egress node for the other. Because the third network apparatus 300 may implement a centralized management of congestion status within the whole network, the control module included therein may determine whether to trigger a query for update congestion estimate information based on a combination of policy, timing mechanism and the validity of CLE.

According to the second approach, the first network apparatus 100 and/or the second network apparatus 200 determines whether to proactively send a CLE to the third network apparatus 300. The second approach is similar to the triggering mechanism in Embodiment 1, i.e., a control module may be included in first network apparatus 100 and/or the second network apparatus 200, configured to perform a control processing, the function of which is similar to the control module 144 in Embodiment 1 and is omitted herein for brevity. The first network apparatus 100 and the second network apparatus 200 are peer apparatuses, and may have exactly the same function, each being an ingress node or an egress node for the other.

Figure 10:
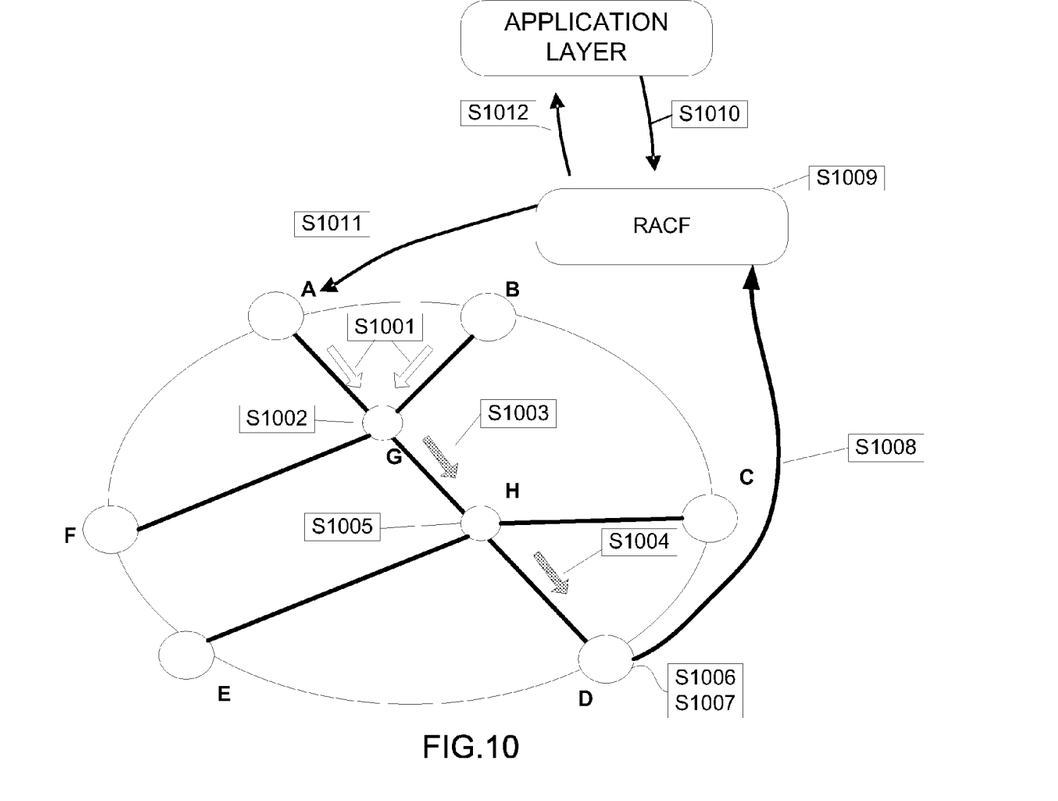
FIG. 10 illustrates information interaction flowchart in RACF architecture combined with the application scenario of PCN transport domain for Embodiment 2 of the present invention in a second approach.

FIG. 10 illustrates information interaction flowchart in RACF architecture combined with the application scenario of PCN transport domain for Embodiment 2 of the present invention in the second approach.

As shown in FIG. 10, in this Pre-Congestion Notification (PCN) network, nodes A, B, C, D, E and F are edge nodes of a transport network, whereas nodes G and H are intermediate nodes. Center control nodes are included in RACF layer, responsible for admission control decision. A-D and B-D construct a node pair for service flow direction A→D and a node pair for service flow direction B→D, respectively. In this embodiment, the information interaction procedure includes the followings.

S1001: Node A and node B send service traffic to intermediate node G.

S1002-S1003: Node G receives the service traffic from node A and node B, and determines whether service congestion occurs. If service congestion occurs, the received service traffic will be marked with a congestion mark. Next, node G transfers the service traffic to node H. Specific processing for determining the service congestion and related algorithm may refer to conventional arts, which are omitted herein for brevity.

S1004-S1005: The processing procedure of node H is to similar to that of node G, which is omitted herein for brevity.

S1006-S1008: Node D receives service traffic from node H, identifies and measures the congestion mark in the service traffic. Then, node D may estimate based on the received congestion mark and acquire a CLE of service flow direction A→D and a CLE of service flow direction B→D respectively. In addition, node D determines whether to send the acquired CLEs to RACF. If the condition is met, node D may send the CLE to RACF.

Referring to FIG. 10, node D determines to send the CLE of service flow direction A→D and/or B→D to RACF, then the CLE of service flow direction A→D and/or B→D will be sent to RACF.

S1009: RACF receives and stores the CLE of service flow direction A→D and/or B→D from node D.

S1010-S1012: When a service traffic request is received, RACF may make an admission control decision based on pre-stored CLE, determine whether to admit this service request, and acquire a decision result. The decision result may include accept/deny, or may also include other parameters.

Then, RACF may instruct node A to perform operations according to the decision result, and respond to this service traffic request.

It is to be noted that S1001-S1009 and S1010-S1012 are relatively independent. Node D may proactively send the CLE to RACF no matter whether or not there is any service traffic request at this point. The CLE status is maintained at RACF. The maintenance method is similar to the method for maintaining the CLE by the admission control entity in Embodiment 1, where mechanism such as CLE updating and periodically aging, as well as querying the CLE from the egress node before the CLE is aged, may also exist.

In the present embodiment, the CLE information may be transmitted among all the nodes over protocols which are usually adopted by RACF and transport nodes such as COPS (Common Open Policy Service) or Diameter.

It is to be noted that nodes A, B, C, D, E and F are edge nodes. These edge nodes may be peer nodes, each of which may have a congestion estimate function and may send the CLE obtained from the estimate to RACF proactively. The specific reporting time of nodes A, B, C, D, E and F may refer to the processing method of the control module 144 in Embodiment 1, which is omitted herein for brevity.

It is to be noted that under RACF architecture, generally, the Application Layer may send a service traffic request to the bearer control layer, e.g., S1010, so that the bearer control layer may make an admission decision according to the status of resources, and instruct the bearer layer (i.e., transport layer, PCN domain in the present example) to execute the decision, e.g., S1011, typically, to instruct an ingress node to switch on a gate control and install the policy.

Embodiment 3

Figure 11:
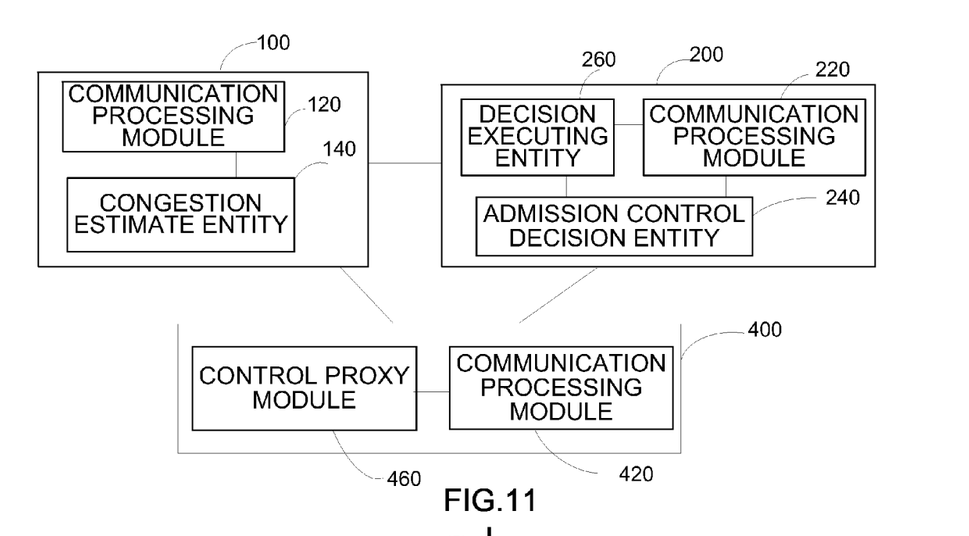
FIG. 11 illustrates a system block diagram according to Embodiment 3 of the present invention.

FIG. 11 illustrates a system block diagram according to Embodiment 3 of the present invention.

The system shown in FIG. 11 includes a first network apparatus 100 and a second network apparatus 200, where a communication link is established between the first network apparatus 100 and the second network apparatus 200, capable of unidirectional or bidirectional service transport. The service traffic from the first network apparatus 100 to the second network apparatus 200 refers to one service flow direction, whereas the service traffic from the second network apparatus 200 to the first network apparatus 100 refers to another service flow direction. The first network apparatus 100 includes a communication processing module 120 and a congestion estimate entity 140. The second network apparatus 200 includes a communication processing module 220 and a decision executing entity 260. The communication processing module 120 and the communication processing module 220 may have a similar or a same function for communication with other network apparatuses. Consequently, a communication connection may be established between the first network apparatus 100 and the second network apparatus 200 via their respective communication processing modules. The basic function of the congestion processing module 140 is to conduct a congestion estimate of traffic in the service flow direction from one or more second network apparatuses 200 to the first network apparatus 100, and acquire a calculated CLE.

The system shown in FIG. 11 further includes a third network apparatus 400. The third network apparatus 400 includes a communication processing module 420 and a control proxy module 460. The communication processing module 420 is configured for communication with other network apparatuses, and may have a function similar to or same with the communication processing modules 120 and 220. Furthermore, the communication processing module 420 may have a greater capability in protocol communication processing than that of the communication processing modules 120 and 220. The control proxy module 460 receives and stores CLE information from one or more the first network apparatuses 100 and/or the second network apparatuses 200 via the communication processing module 420.

The present embodiment is roughly the same as Embodiment 1, the main features of which still lie in that admission control decision is implemented at an ingress node (e.g., the second network apparatus 200). In the present embodiment, the time for sending CLE by the egress node (e.g., the first network apparatus 100) is the same as that of Embodiment 1, the maintenance of CLE status by the ingress node is the same as that of Embodiment 1, and the determination of admission control by the ingress node is also the same as that of Embodiment 1. However, in Embodiment 1, numerous signaling messages are consumed when there are lots of edge nodes, because CLEs need to be transmitted between each two edge nodes. Therefore, a reflection method for transferring CLE with high efficiency is addressed according to the present embodiment, and the reflection method may be applied when there are quite a lot of edge nodes.

Figure 12:
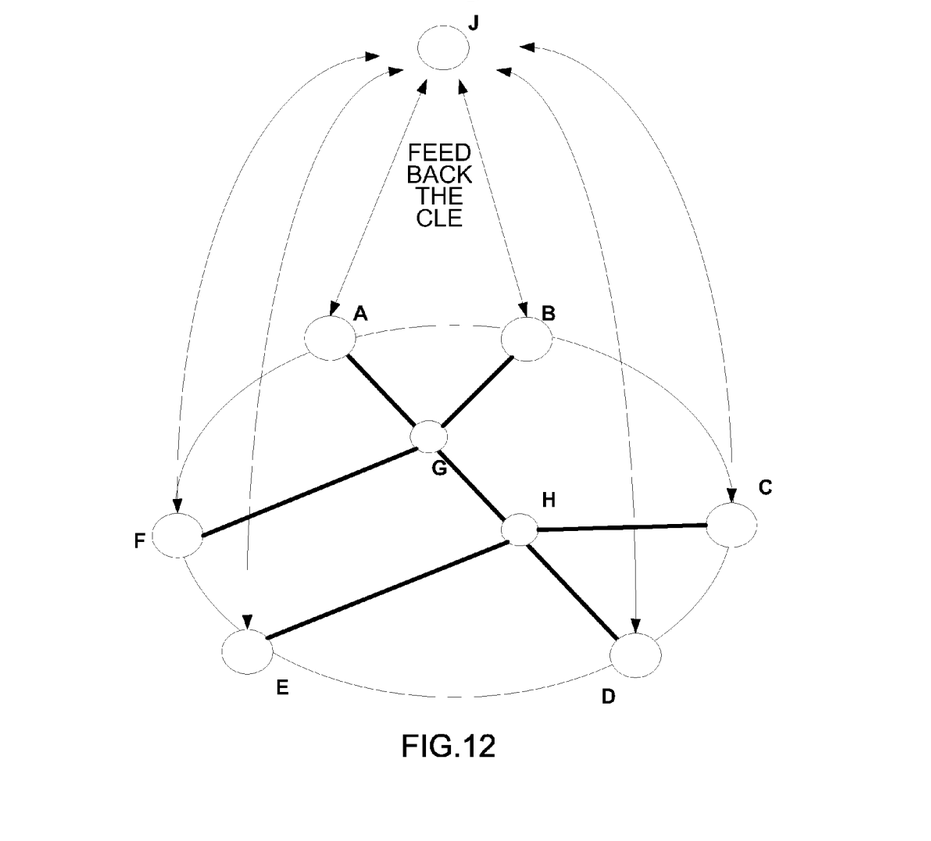
FIG. 12 illustrates a schematic diagram of Embodiment 3 of the present invention implemented in an application scenario of PCN network domain.

FIG. 12 illustrates a schematic diagram of Embodiment 3 of the present invention implemented in an application scenario of Pre-Congestion Notification (PCN) network.

Referring to FIG. 12, assume that there are six edge nodes, i.e., A, B, C, D, E and F, and one reflection node J is deployed.

A sends CLEs of service flow directions B→A, D→A, C→A, E→A, F→A to J, where these CLEs are incorporated in one message;

B sends CLEs of service flow directions A→B, D→B, C→B, E→B, F→B to J, where these CLEs are incorporated in one message;

C sends CLEs of service flow directions B→C, D→C, A→C, E→C, F→C to J, where these CLEs are incorporated in one message;

D sends CLEs of service flow directions B→D, C→D, A→D, E→D, F→D to J, where these CLEs are incorporated in one message;

E sends CLEs of service flow directions B→E, A→E, A→E, D→E, F→E to J, where these CLEs are incorporated in one message;

F sends CLEs of service flow directions B→F, A→F, C→F, D→F, E→F to J, where these CLEs are incorporated in one message.

The CLEs are rearranged at node J and delivered thereafter.

J sends CLEs of service flow directions A→B, A→C, A→D, A→E, A→F to A, where these CLEs are incorporated in one message;

J sends CLEs of service flow directions B→A, B→C, B→D, B→E, B→F to B, where these CLEs are incorporated in one message;

J sends CLEs of service flow directions C→B, C→A, C→D, C→E, C→F to C, where these CLEs are incorporated in one message;

J sends CLEs of service flow directions D→B, D→C, D→A, D→E, D→F to D, where these CLEs are incorporated in one message;

J sends CLEs of service flow directions E→B, E→C, E→A, E→D, E→F to E, where these CLEs are incorporated in one message;

J sends CLEs of service flow directions F→B, F→C, F→A, F→D, F→E to F, where these CLEs are incorporated in one message.

As can be seen from this example, 12 messages are used in all when there are six edge nodes, whereas 30 messages are required if the method for sending CLEs directly between the edge nodes is adopted as illustrated in Embodiment 1. When there are 100 nodes, only 200 messages are required in terms of the reflection method, whereas 9900 messages are required in terms of the method of direct sending. This is only one example, actual implementations may be more complex. However, the reflection method may reduce the number of signaling messages in any case.

Figure 13:
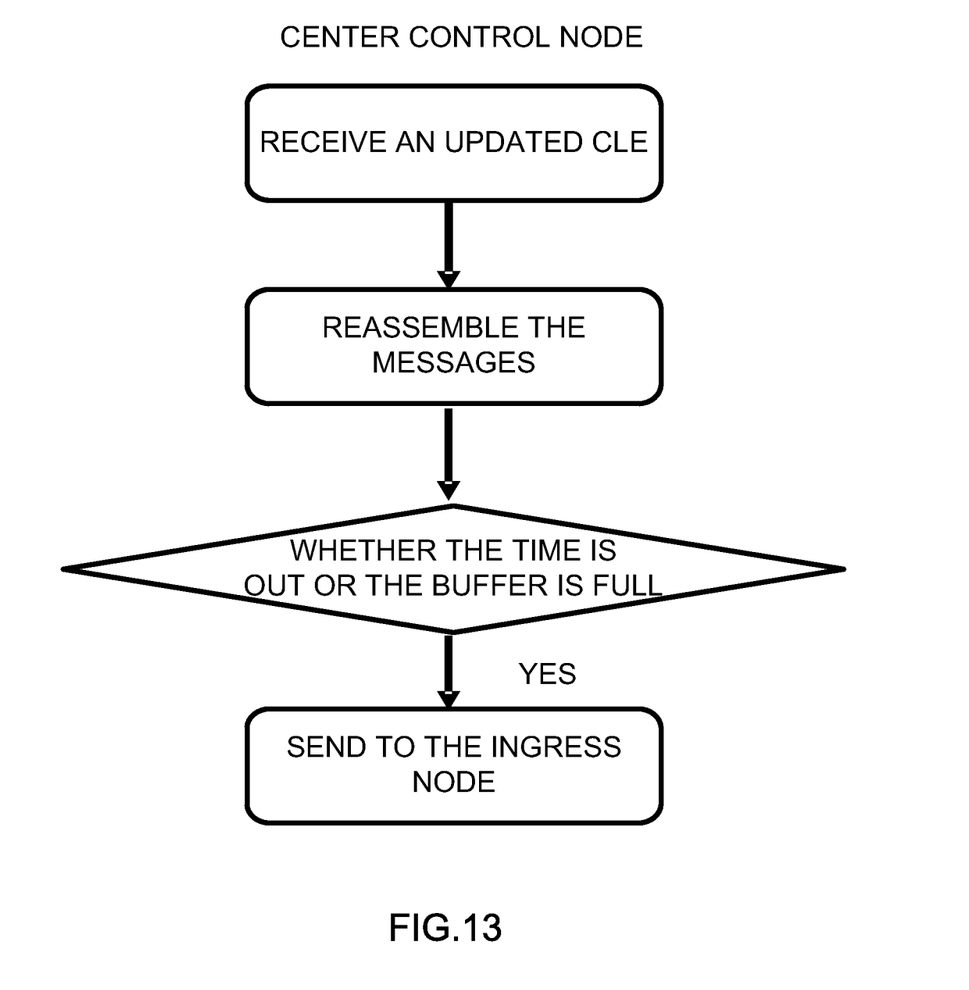
FIG. 13 illustrates a processing flowchart of a center reflection node.

The center reflection node needs to receive CLE update messages from the egress nodes, cache and then deliver the CLE update messages. The procedure thereof is illustrated as the processing flowchart of the center reflection node in FIG. 13.

Lastly, there is a need to explain the issue of addressing involved in the present invention. Some may relate to conventional arts. Some may not relate to the contents of the present invention, but server as the basis of the present invention.

1. The egress node determines an ingress node from which messages are received from the PCN domain. This is the basis of PCN mechanism, and can be achieved in various ways according to the conventional arts. For example, this can be configured statically, automatically discovered by a routing node or an edge node, or notified via a control layer, e.g., collected from signaling such as RSVP.

2. The ingress node determines an egress node via which messages to the PCN domain are sent out. This is also the basis of PCN mechanism. And this can be configured statically, automatically discovered by a routing node or an edge node, or notified via a control layer.

3. According to Embodiment 1, the address of the admission control decision entity is determined by the egress node. Because the admission control decision entity is implemented at the ingress node, the egress node may thereby send CLEs to the corresponding ingress node.

4. According to Embodiment 2, the admission control decision entity is implemented at a center control node of the bearer control layer. At this point, each egress node needs to configure the address of this center control node, or determines the address of the admission control decision entity via discovery mechanism.

5. According to Embodiment 3, each egress node needs to configure the address of a relay agent, or determines the address of the relay agent via discovery mechanism.

With the description of the foregoing embodiments, it is readily appreciated by those skilled in the art that the present invention may be implemented with software on a necessary hardware platform. Of course, the embodiment may also be implemented with hardware. But, most of the time, the former approach is more preferable. Based on this understanding, technical solutions of the present invention, or the part which the present invention makes contribution over the conventional art may be embodied in a software product. The computer software product may be stored in a readable storage media. The software product may include a set of instructions enabling a computer (may be a personal computer, a server, or a network device, etc.) to perform methods according to various embodiments of the present invention.

In summary, the foregoing is merely exemplary embodiments of the present invention and is not intended to be limiting to the scope of the present invention. Any modifications, equivalents, improvements made within the spirit and principle of the present invention shall be construed as fall within the scope of the present invention.

What is claimed is:

1. A method for admission control, comprising:

measuring, by an egress node, traffic from an ingress node, and calculating a current congestion degree;

comparing, by the egress node, the current calculated congestion degree and a last calculated congestion degree in order to determine whether the current calculated congestion degree exceeds a predetermined threshold which is not exceeded by the last calculated congestion degree, and sending the current calculated congestion degree to an admission control decision entity by the egress node only if the predetermined threshold falls within a range defined by the current calculated congestion degree and the last calculated congestion degree;

receiving and storing the congestion degree by the admission control decision entity; and making a decision by the admission control decision entity based on the stored congestion degree, and determining whether to admit a service traffic request, when the service traffic request arrives at the admission control decision entity;

wherein the admission control decision entity is configured at the ingress node, and sending the congestion degree to the admission control decision entity by the egress node comprises:

sending, by the egress node, the congestion degree to a relay agent node; and reassembling congestion degrees from a plurality of egress nodes by the relay agent node, packaging congestion degrees that belong to the same ingress node into one message, and then forwarding the message to the admission control decision entity configured at the ingress node.

2. The method of claim 1, further comprising:

periodically sending the current calculated congestion degree to the admission control decision entity by the egress node according to a time interval.

3. The method of claim 1, further comprising:

periodically querying the congestion degree from the egress node by the admission control decision entity according to a time interval.

4. The method of claim 1, further comprising:

periodically aging and invaliding the congestion degree by the admission control decision entity.

5. A communication system, comprising:

a first edge node, configured to measure traffic from a second edge node, calculate a current congestion degree; and compare the current calculated congestion degree and a last calculated congestion degree in order to determine whether the current calculated congestion degree exceeds a predetermined threshold which is not exceeded by the last calculated congestion degree, then send the current calculated congestion degree to an admission control decision entity only if the predetermined threshold falls within a range defined by the current calculated congestion degree and the last calculated congestion degree; and the admission control decision entity, configured to receive and store the congestion degree, make a decision about whether to admit a service traffic request based on the stored congestion degree when the service traffic request arrives at the admission control decision entity;

wherein the admission control decision entity is set at the second edge node, and the communication system further comprises:

a relay agent node, configured to reassemble congestion degrees from a plurality of the first edge nodes, package congestion degrees belonging to the same ingress edge node into one message, and send to the admission control decision entity configured at the second edge node.

6. The communication system of claim 5, wherein a timing task is configured for the admission control decision entity, where the admission control decision entity periodically queries a congestion degree from the first edge node according to a time interval; or a timing task is configured for the first edge node, where the first edge node sends a congestion degree to the admission control decision entity each time when the timing task ends.

7. The communication system of claim 5, wherein an aging task is configured for the admission control decision entity to age and invalid a congestion degree periodically, where the admission control decision entity queries the congestion degree from the first edge node before the congestion degree is invalided.

* * * * *